(12) United States Patent
Smelyansky (10) Patent No.: US 8,260,868 B2
(45) Date of Patent: Sep. 4, 2012

(54) MANAGING A UNIFIED COMMUNICATION STORAGE SERVER FROM AN END USER EMAIL READER

(75) Inventor: Vladimir Smelyansky, Glenview, IL (US)

(73) Assignee: Xcastlabs, Los Angeles, CA (US)

( * ) Notice: Subject to any disclaimer, the term of this patent is extended or adjusted under 35 U.S.C. 154(b) by 55 days.

(21) Appl. No.: 12/369,087

(22) Filed: Feb. 11, 2009

(65) Prior Publication Data

US 2010/0205258 A1    Aug. 12, 2010

(51) Int. Cl.
*G06F 15/16* (2006.01)
(52) U.S. Cl. ......... 709/206; 709/204; 709/205; 709/207
(58) Field of Classification Search ........... 709/204–207
See application file for complete search history.

(56) References Cited

U.S. PATENT DOCUMENTS

| | | | |
|---|---|---|---|
| 7,039,933 B1* | 5/2006 | Chen et al. | 725/36 |
| 7,599,476 B2* | 10/2009 | Pantana et al. | 379/88.13 |
| 2001/0054073 A1* | 12/2001 | Ruppert et al. | 709/206 |
| 2002/0116467 A1* | 8/2002 | Boyer et al. | 709/206 |
| 2002/0131561 A1* | 9/2002 | Gifford et al. | 379/67.1 |
| 2004/0034688 A1* | 2/2004 | Dunn | 709/206 |
| 2005/0076085 A1* | 4/2005 | Budd et al. | 709/206 |
| 2005/0188026 A1* | 8/2005 | Hilbert et al. | 709/206 |
| 2006/0031309 A1* | 2/2006 | Luoffo et al. | 709/206 |
| 2006/0177077 A1* | 8/2006 | Okada et al. | 381/119 |
| 2009/0138562 A1* | 5/2009 | Schmulen et al. | 709/206 |
| 2009/0282107 A1* | 11/2009 | O'Sullivan et al. | 709/206 |
| 2009/0313554 A1* | 12/2009 | Haynes et al. | 715/752 |

* cited by examiner

Primary Examiner — Duyen Doan
(74) Attorney, Agent, or Firm — Murphy & King, P.C.

(57) ABSTRACT

An efficient article and method for automating the process of changing the status of a voicemail (or other multimedia message or object) that is stored in a multimedia server (such as a voicemail server), when the voicemail has been associated with an email, and the email has been opened by the intended recipient.

20 Claims, 4 Drawing Sheets

MANAGING A UNIFIED COMMUNICATION STORAGE SERVER FROM AN END USER EMAIL READER

FIELD OF INVENTION

The present invention generally relates to information technology, and more particularly relates to the use of an email-reading application to control the status of messages stored in a multimedia message management system.

BACKGROUND OF THE INVENTION

Many telecommunication companies now offer a voicemail service. In the current art, when a subscriber places a call from a telephone number associated with a voicemail mailbox account, that subscriber may be audibly notified of the existence of waiting voicemail (or other types of multimedia messages). The audible notification may be via a "stutter dial tone" or frequency-shift-keyed (FSK) tones. Alternatively, there are "off-hook" devices, which may be coupled to a telephone, or incorporated within a telephone, that allow such notification to be detected by a subscriber visually in addition to (or instead of) audibly. This type of notification is also applicable to other types of messages existing for the subscriber on the central server. Notification can also be provided by an intelligent indication device (such as a viewable computer screen display) that shows the quantity and status of each type of message that awaits retrieval by the subscriber.

There are currently multiple systems that allow forwarding the various types of multimedia messages to a subscriber's email address. The email service used for storage of the forwarded messages can be provided by the same system that forwards the messages, or by a third party's email server.

In the current art, a major inconvenience related to checking multimedia messages from an email-reading application is that a retrieved message doesn't change status in the central storage device after being retrieved by the customer.

In current voicemail systems, a voicemail message is not marked as retrieved on the voicemail server where the original voicemail is stored when a user retrieves that voicemail via a remote email client (to which the voicemail message has been forwarded). Therefore, subscriber notification remains active on the voicemail server even though the user has already heard the message. For instance, a Message Waiting Indicator (MWI) and/or (when the subscriber goes off-hook on the phone associated with that voicemail address) a stutter dial tone would mislead the user by indicating that a new voicemail still exists.

In the current art, solutions provide for synchronization between a centralized message storage server and a remote email storage server. This synchronization is accomplished between the two servers to insure that messages retrieved via email are identified on the centralized storage server as having been retrieved. This synchronization approach has the disadvantage that it is not available as a feature on all centralized message storage systems. It also has the disadvantage that, if one of the servers has a communication link failure, the synchronization may not occur until after that failure is corrected. During a communications failure, before the synchronization can take place, the user may access their voicemail account and discover that retrieved messages are still identified as not having been retrieved.

Another key disadvantage of the server-to-server synchronization approach is that most service providers do not allow access to their server systems by remote systems not entirely under the control of the provider. This is not only for the sake of security, but also to eliminate the complexity of maintaining a system that is vulnerable to uncontrollable external errors and failures. Very few service providers are willing to risk the integrity of their stored messages and data (and the overall throughput of their systems) by allowing other companies to access their system for the purpose of controlling the status of waiting messages.

Another solution seen in the current art is the integration of both email and multimedia message storage into one unified storage system. This approach has several disadvantages. First, for a user to get a new account on a unified message server (that combines voicemail and email in the same server), the user has to change their existing email address. This is both expensive and inconvenient, and may not be practical in many cases. Notification of each known correspondent (and any anticipated correspondents) is time-consuming and tedious. Often email addresses have been published in many forms, including printed and distributed advertising. Reprinting and redistributing advertising materials is an expense, and can be confusing to potential customers. There is always the likelihood that older distributed materials will persist, and when discovered will cause potential customers to send messages to a discontinued address. This puts at risk new business opportunities for the company or person who had to change their email address in order to utilize the feature.

It is also a disadvantage that, if a company has all of its employees using one type of email server, migration of each of the subscriber accounts to a new unified message storage system is a very complex process. It involves disruption of email service for a period of time, as well as re-education of each employee. Additionally, the unified message storage system may be incompatible with other systems already in use by the company, its users and their correspondents.

It also can be seen that existing solutions force a message to be marked as old, when in reality the user may not want the status of the message to be changed, or may want it to be changed differently. For example, the most common reaction to voicemail is its removal after processing. It is inconvenient for the user to retain too many voicemail messages. In addition, the central storage system or its operators typically limit the total quantity of stored (retained) voicemail messages.

Thus, when an existing system only marks the stored voicemail message as "old", but doesn't allow the user to select a "delete voicemail" option, the user must then, inconveniently, take a separate action to directly contact the central storage system and perform additional processing of the messages marked as "old".

The user may accomplish this by dialing into their voicemail server using a phone, and then pressing a sequence of telephone buttons to accomplish deletion of the old messages. Alternately, the user may activate an Internet connection directly with the centralized storage system, and then interact with the system's user interface to delete the old emails. In either case, taking these extra steps represents a significant inconvenience to the user. This is especially true with some voicemail servers that require a user to once again listen to the entire voicemail message prior to allowing the user to delete the message from storage.

From the description of the current art, it can be seen that what is needed is a method for automatically updating the status of retrieved multimedia (or other types of) messages in a centralized unified message storage system when the message is opened via email. It can also be seen that a method is needed for accomplishing this without requiring the user to switch to a new unified message server, thus avoiding the requirement to change existing email addresses of users.

Further, it can be seen that this method would best be accomplished using a direct communication between the email-retrieval client and the unified message storage system, without the intervention of specialized services provided by a separate server.

Finally, it can be seen that a solution is needed that does not require the user to modify or replace their existing email client and/or web browser.

SUMMARY OF THE INVENTION

The solution of the present invention doesn't have any of the limitations of the current art, and resolves the major issues related to remotely controlling the status of messages retrieved from a centralized unified message storage system without modification of the user's email client or web browser.

In the solution of the present invention, the status of each centrally stored message for a user is established based on the user's actions from within the user's own email-reading client. In the present invention, when the user opens an email with a voicemail (or other multimedia message) attached, the user's email-reading client (either automatically, or by user selection) activates a special tag or tags placed into the body of a retrieved email, and the activated object communicates with the storage system to modify the status of stored copy of the retrieved message.

There are two embodiments of this approach:
1. Automated Status Update: Automatically changing the status of a retrieved message from "new" to "old" as soon as an email with the proper attachment is opened by the customer. This embodiment of the invention provides the advantage of having much less complexity and expense relative to the prior art.
2. Customer-selected Status Update: The customer can make a decision about the status of a retrieved message by taking the appropriate actions using the email-client, such as clicking on an embedded hyperlink tag.

Automated Status Update:

In the first embodiment, the retrieved email with the attached message is received in HTML format and contains a special tag in the body of the email that links back (directly or indirectly) to the centralized unified message storage system server. For example, the tag could be a link (having the appropriate parameters) to an image or Iframe that, in reality, corresponds to an executable object like a CGI script on the server, such as:
<img width=30 height=100 src="http://server.domain.com/vmprocess?id=461328742137841290834798732 4>

In this case, the actual file "vmprocess" on the centralized message storage server is an executable script (not an image). The executable script checks the ID value to see if there is a voicemail with which it is associated. If there is, the script deletes the associated voicemail and sends back an image with the word "Deleted" in it. If the named "image" file or provided ID does not exist, the server does not respond, and logs the IP address from where the request came as a potential source of hacking attacks.

The executable object on the server may provide different functions, including the two named below:
1. Upon reception of a request sent by an email client, and based on the parameters attached to the received request, the object communicates with the central storage system and requests that the status of a stored message be changed. By examining the parameters, the object can determine what status change request is being made, as well as the identity of the target message.
2. After performing a selected action, the object returns an image to the customer email client. The choice of returned image is based on the result of the requested operation. For example, the returned image could display text confirming that the stored message was deleted.

Customer-Selected Status Update:

In an alternate embodiment of the present invention, the received email (with the retrieved message attached) includes in its body one or more hyperlink tags, and requires user interaction before any message status changes are requested. The server object to which each hyperlink tag points takes a specific action that corresponds to the text displayed for the hyperlink. The displayed text of the hyperlink tag can be "delete", "save", "mark as urgent" or any other action applicable to the attached message. When a user clicks upon one of the hyperlink tags contained in the email body, the browser transmits a request to the object identified in the hyperlink, thereby initiating the process of accomplishing the action named in the hyperlink tag's text (i.e., "save").

For instance, the body of the email may have a hyperlink that has the text "Delete", such as:
<a href="/vmprocess?id=46132874213784129083479873 24&action=d>Delete</a>

When the user clicks upon this link, the client browser sends a request to the centralized message storage server, activating the appropriate server object that, in turn, directly communicates with the centralized message storage server to request that the selected message be deleted.

In the body of that same email, there can also be a hyperlink that has the text "Save", for instance:
<a href="/vmprocess?id=46132874213784129083479873 24&action=s>Save</a>

When the user clicks upon this link, the client browser sends a request to the centralized message storage server, activating the appropriate server object that, in turn, directly communicates with the centralized message storage server to request that the selected message be saved.

The "id" value shown in the examples above is a specially generated long code that can be any combination of alphanumeric characters. The association with the actual server-stored message can either be cross-referenced on the server or encoded inside the value of the id itself.

If the user of this type of solution does not click on either link, none of the objects are activated, no communication occurs between any of the tags and the unified message storage system, and the unified message storage server takes no action related to the message.

Both of these approaches utilize at least one tag (such as a hyperlink) in the retrieved email, and a corresponding object residing on the unified message storage server. The communication between these objects can follow currently well-known and commonly used network protocols, and does not require special intervention of a third-party service. In the preferred embodiment of the present invention, there is no vulnerability to third-party server outages or failures, since post-retrieval synchronization is not required. The actions to change message statuses are accomplished immediately as the email is opened, or, alternately, as the user chooses to take an action related to a message.

In another application of the invention, an alarm monitoring system has an alarm server that uses the Internet to pass alert emails to a paging system. These emails each automatically generate a page to a repairperson. In a typical system of this sort, the alarm server will send subsequent reminder emails about an alarm until the repairperson has cleared the alarm. Also, when many alarms arrive at once (as often is the case), a flood of pages arrives for the repairperson. Having to clear each alarm before the repetitive reminder pages arrive can be cumbersome or impractical. Often the repairperson is already working on a problem, but reminder pages continue to arrive, distracting the person from their work.

In this application of the present invention, the alert emails are also sent to the repairperson, and contain HTML tags that provide actions such as "mark as seen", "reset", "clear all", "ignore", "snooze", "remind in one day", "remind in one week", etc. In this solution, the alarm-monitoring repairperson can simply click on an action in an email to handle the alarm, instead of having to take the additional actions of connecting to the alarm server and then working through the server's human interface.

BRIEF DESCRIPTION OF THE DRAWINGS

The invention will be better understood, and objects other than those set forth above will become apparent, when consideration is given to the following detailed description thereof. Such description makes reference to the annexed drawings, wherein.

DETAILED DESCRIPTION OF THE PREFERRED EMBODIMENTS

Figure 1:
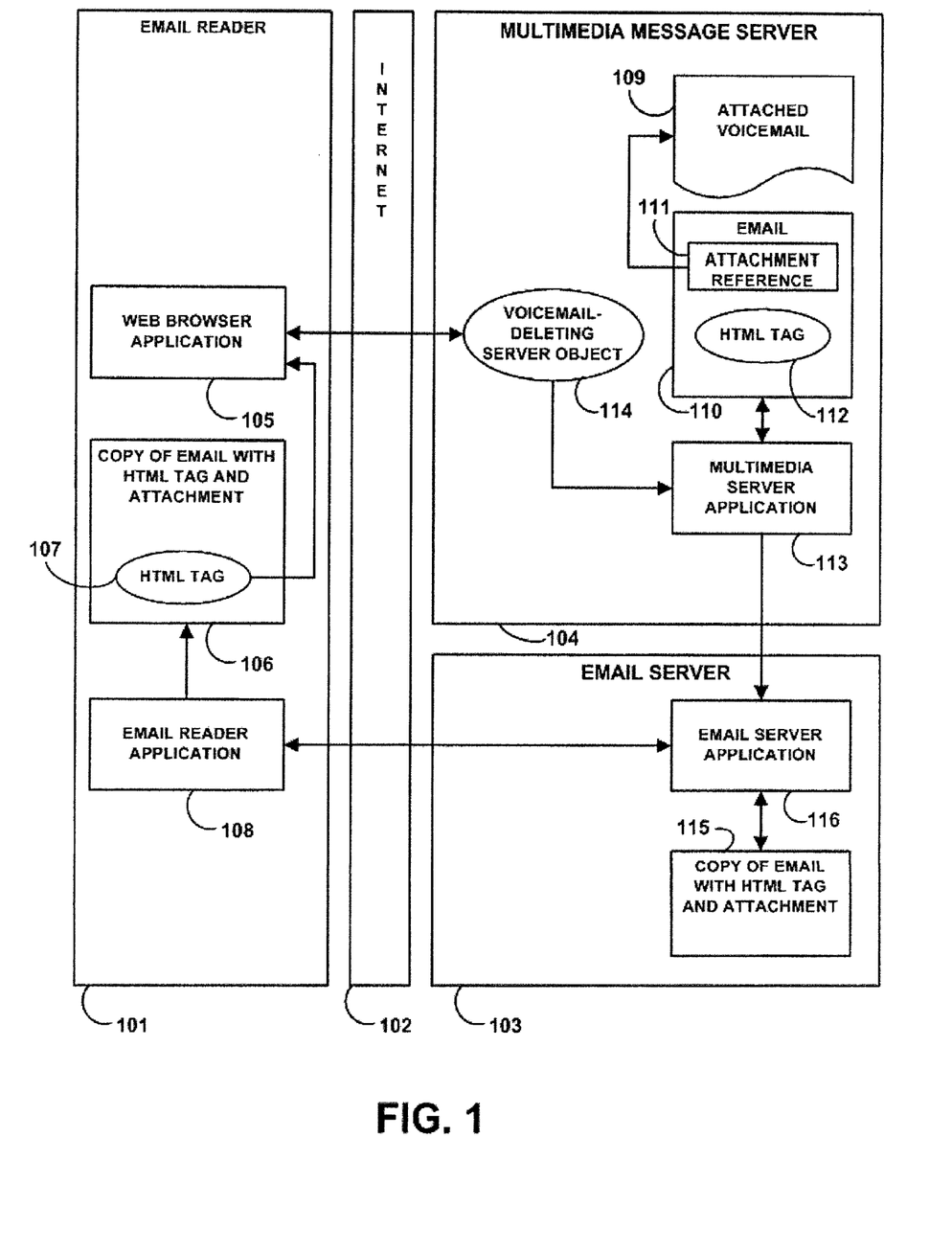
FIG. 1 is a simplified block diagram showing the components involved with the preferred embodiment of the invention, wherein a hyperlink tag embedded in an email body is automatically activated when the email reader opens the email.

Now referring to FIG. 1, a system of components is shown that interact to automate the process of updating the status of a voicemail when the voicemail has been attached to an email, and its recipient opens the email.

Referring still to FIG. 1, it can be seen that there is an email reader 101 that operates an email reader application 108 that displays a copy of an email 106. Email reader 101 also operates a web browser application 105. Email copy 106 has an HTML tag 107 that, when activated, causes web browser application 105 to send a request via Internet 102. The information contained in HTML tag 107 is used by web browser application 105 to determine the destination address (URL) to where the request is to be sent, as well as what parameters to include in the request.

Still referring to FIG. 1, there is an email server 103 that operates an email server application 116. When email server application 116 receives a new copy of an email 115, the copy of the email 115 is stored locally.

Also shown in FIG. 1 is a multimedia server 104 that operates a multimedia server application 113. Multimedia server application 113 has an automated program interface (API) that allows other applications to communicate requests to multimedia server application 113.

When voicemail 109 is received and stored for a subscriber, multimedia server application 113 automatically generates email 110, addressed to that subscriber, attaching a digital representation of stored voicemail 109 to email 110. Multimedia server application 113 also inserts into the body of email 110 HTML tag 112 that contains the URL and parameters for linking to voicemail-deleting server object 114.

Auto-composed email 110 is sent by multimedia server application 113 to email server application 116 operating on email server 103, which in turn stores a local copy of the email 115.

When email reader application 108 sends a request for stored emails via Internet 102 to email server application 116, email server application 116 sends the stored copy of email 115 in a response via Internet 102.

Upon receipt of copy of email 115, email reader application 108 stores its own copy of the email 106. When the user of email reader 101 opens email copy 106, HTML tag 107 is automatically activated by web browser application 105. The activated HTML tag 107 causes web browser application 105 to send a request via Internet 102 to voicemail-deleting server object 114.

When voicemail-deleting server object 114 receives the request generated by HTML tag 107, voicemail-deleting server object 114 communicates with multimedia server application 113, requesting deletion of the voicemail 109 stored on multimedia server 104 (that is, the voicemail associated with email copy 106). Multimedia server application 113 then deletes the locally stored voicemail file 109, and internally updates the voicemail subscriber's voice mailbox to no longer indicate that the now-deleted voicemail 109 is still waiting to be heard.

Figure 2:
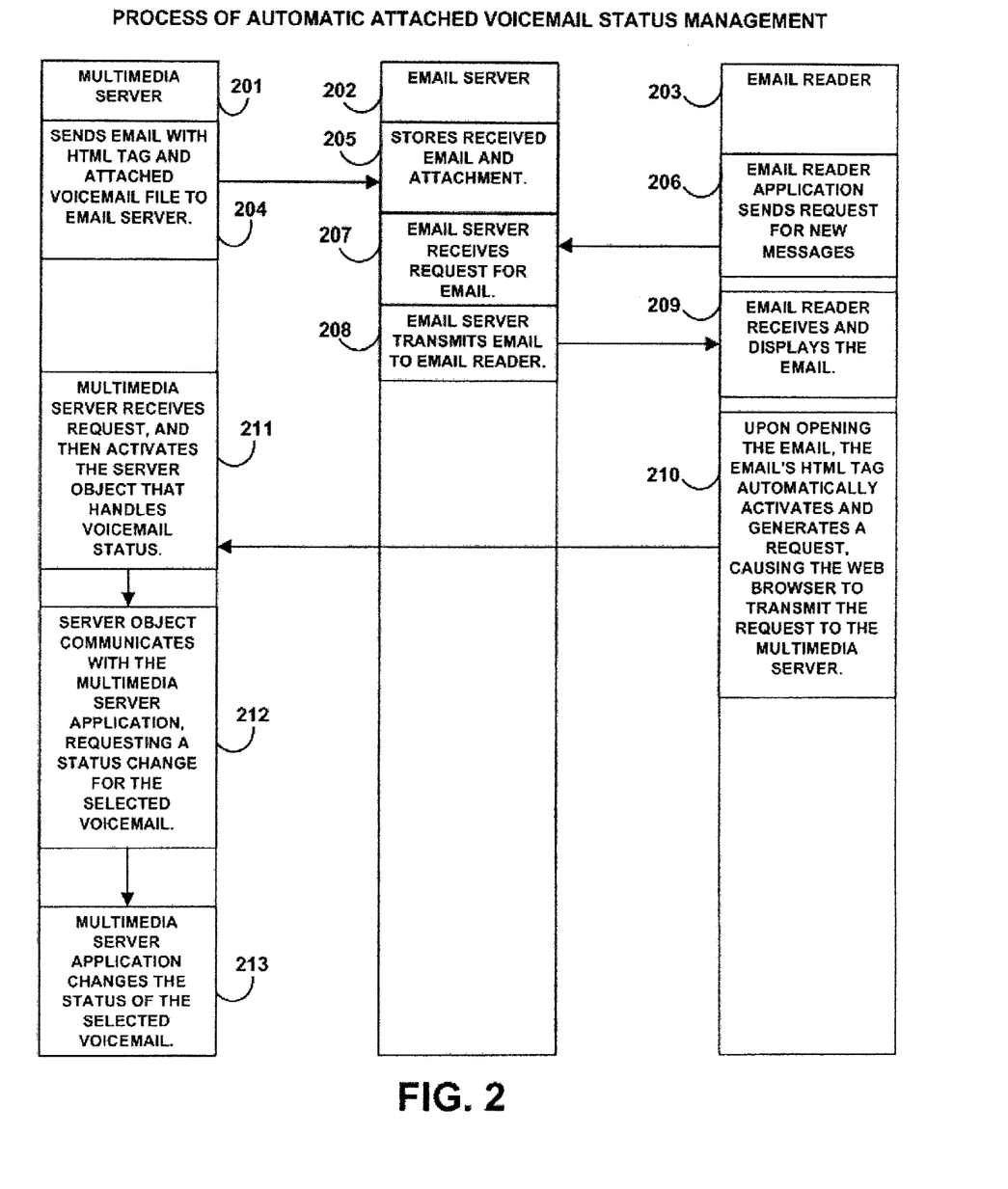
FIG. 2 is a process diagram that describes the order of actions involved with an automated change of status of a multimedia message stored on a multimedia server when an email recipient opens an email message that has that multimedia message attached.

Now referring to FIG. 2, a process of automatic attached voicemail status management is shown. This drawing represents the actions taken by various components during the process of automatically changing the status (deleting, in this example) of a voicemail.

Still referring to FIG. 2, it can be seen that multimedia server 201 completes step 204, wherein an email (with a HTML tag and attached voicemail file) is sent to email server 202. Email server 202 then completes step 205, wherein a copy of the email and its attachment are stored locally. The email and its attachment remain stored until a request is received to retrieve them, or may alternately be automatically deleted by email server 202 after a certain period of time. This is dependent on the policies of the enterprise that operates email server 202.

In step 206, the email reader application operating on email reader 203 sends a message to email server 202, requesting any new email messages. When email server 202 receives this request in step 207, it responds in step 208 by transmitting a copy of the stored email and its attached voicemail file to email reader 203. In step 209, email reader 203 receives and displays the email.

When the email is opened (in step 210), the HTML tag contained in the email is automatically activated, thereby generating a request that is transmitted to multimedia server 201. In step 211, multimedia server 201 activates the server object that handles voicemail status.

The server object then communicates, in step 212, with the multimedia server application operating on multimedia server 201, requesting a status change for the selected voicemail.

Finally, in step 213, changes the status of the selected voicemail as requested. In one embodiment of the present invention, the requested status is "deleted", in which case the voicemail file stored in multimedia server 201 is deleted, and the status of the voicemail is simultaneously changed to indicate that the voicemail is deleted. In an alternate embodiment of the present invention, the requested status is "mark as heard", in which case the voicemail file is retained in multimedia server 201, but the status of the voicemail is changed to "old."

In this manner, when a voicemail is sent to a subscriber as an attachment to an email, when the subscriber opens the email, the status of the attached voicemail is automatically updated in the multimedia server where it was originally stored.

Figure 3:
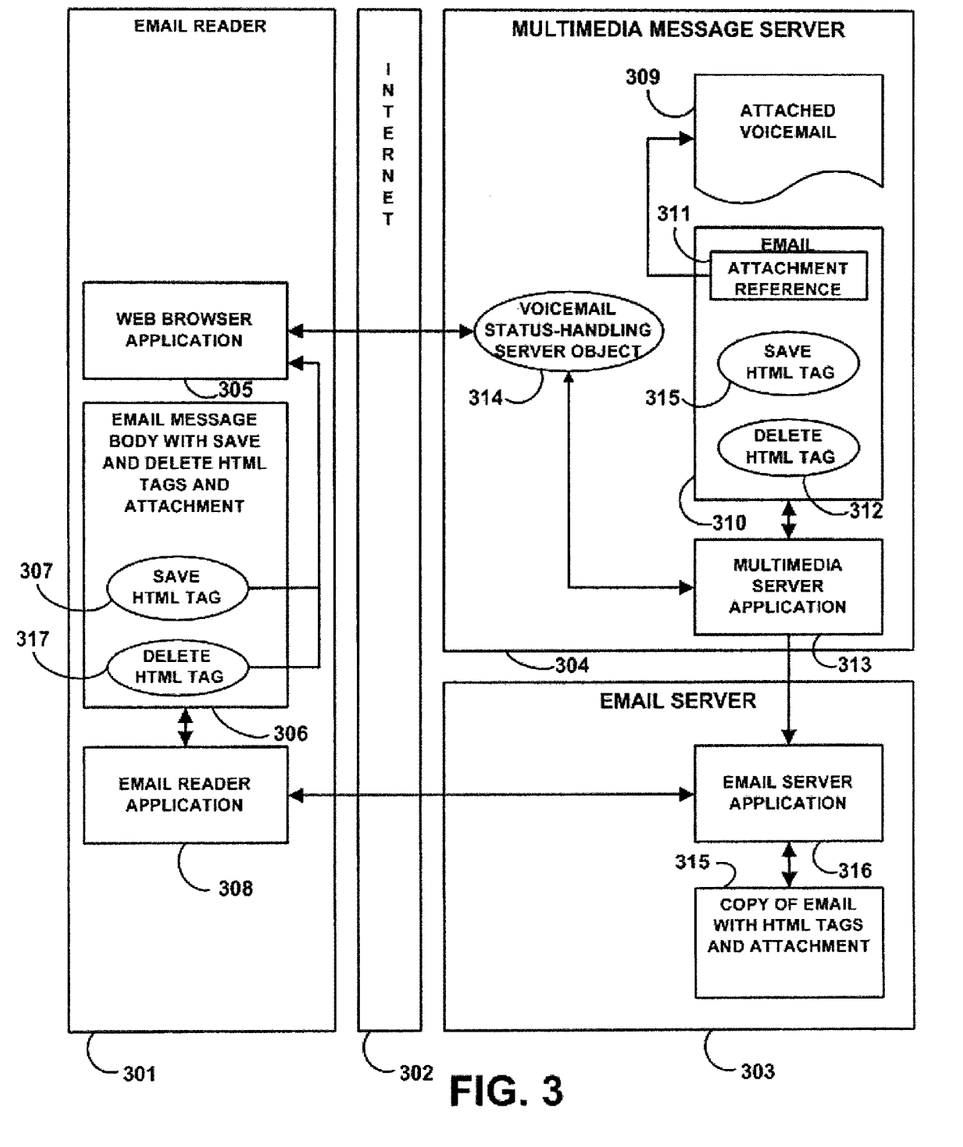
FIG. 3 is a simplified block diagram showing the components involved with an alternate embodiment of the invention, wherein one of a plurality of hyperlink tags contained in the body of an email is activated when the user clicks on the selected hyperlink tag.

Now referring to FIG. 3, a system of components is shown that interact to automate the process of updating the status of a voicemail when the voicemail has been attached to an email, and its recipient interactively activates an HTML tag in the body of the email.

Referring still to FIG. 3, it can be seen that there is an email reader 301 that operates an email reader application 308 that displays a copy of an email 306. Email reader 301 also operates a web browser application 305. Email copy 306 has an HTML tag 307 that, when activated, causes web browser application 305 to send a request via Internet 302. The information contained in HTML tag 307 is used by web browser application 305 to determine the destination address (URL) to where the request is to be sent, as well as what parameters to include in the request.

Still referring to FIG. 3, there is an email server 303 that operates an email server application 316. When email server application 316 receives a new copy of an email 315, the copy of the email 315 is stored locally.

Also shown in FIG. 3 is a multimedia server 304 that operates a multimedia server application 313. Multimedia server application 313 has an automated program interface (API) that allows other applications to communicate requests to multimedia server application 313.

When voicemail 309 is received and stored for a subscriber, multimedia server application 313 automatically generates an email 310 addressed to that subscriber, attaching into email 310 a digital representation of stored voicemail 309 to the email (or, alternately, inserting into email 310 a reference link (HTML tag) to voicemail 309). Multimedia server application 313 also inserts into the body of email 310 a HTML tag 312 that contains the URL and parameters for linking to voicemail status-changing server object 314. HTML tag 312 also has parameters that contain the unique identity of voicemail 309, and that identify the action to take as "delete."

Multimedia server application 313 additionally inserts into the body of email 310 a HTML tag 315 that contains the URL and parameters for linking to voicemail status-changing server object 314. HTML tag 315 also has parameters that contain the unique identity of voicemail 309, and that identify the action to take as "save."

Automatically composed email 310 is sent by multimedia server application 313 to email server application 316 operating on email server 303, which in turn stores a local copy of the email 315.

When email reader application 308 sends a request for stored emails via Internet 302 to email server application 316, email server application 316 sends the stored copy of email 315 in a response via Internet 302.

Upon receipt of a copy of email 315, email reader application 308 stores its own copy of the email 306. When the user of email reader 301 opens email copy 306, email reader application 308 displays email 306 to the user, providing the user access to the inserted HTML tags 307 and 317.

If the user clicks on "save" HTML tag 307, web browser application 305 Addresses and transmits a request, via Internet 302, to voicemail status-changing server object 314. This request carries the parameters contained in HTML tag 307 (the unique identity of stored voicemail 309 and that the selected action is "save").

If the user clicks on "delete" HTML tag 317, web browser application 305 composes, addresses and transmits a request, via Internet 302, to voicemail status-changing server object 314. This request carries the parameters contained in HTML tag 317 (the unique identity of stored voicemail 309 and that the selected action is "delete").

When voicemail status-changing server object 314 receives the request sent by web browser application 305, it analyzes the request parameters. Voicemail status-changing server object 314 then sends a command to multimedia server application 313 that identifies stored voicemail 309. The command also contains the instruction as to the action to take regarding stored voicemail 309 ("save" if the user clicked on "save" HTML tag 307, or "delete" if the user clicked on "delete" HTML tag 317).

When multimedia server application 313 receives the command sent by voicemail status-changing server object 314, multimedia server application 313 performs the identified action ("save" or "delete") to stored voicemail 309.

It would be obvious to someone reasonably skilled in the art that any practical quantity of HTML tags could be inserted into email 310 by multimedia server application 313, each pointing to voicemail status-changing server object 314, and each containing a different action parameter. For instance, the actions "mark as old" and "mark as new" would by typical of what would be appropriate in an application of the invention in a voicemail server. In an example where the invention is applied to a network alarm monitoring server, the actions "mark as seen", "reset", "clear" and "ignore" would be typical.

Figure 4:
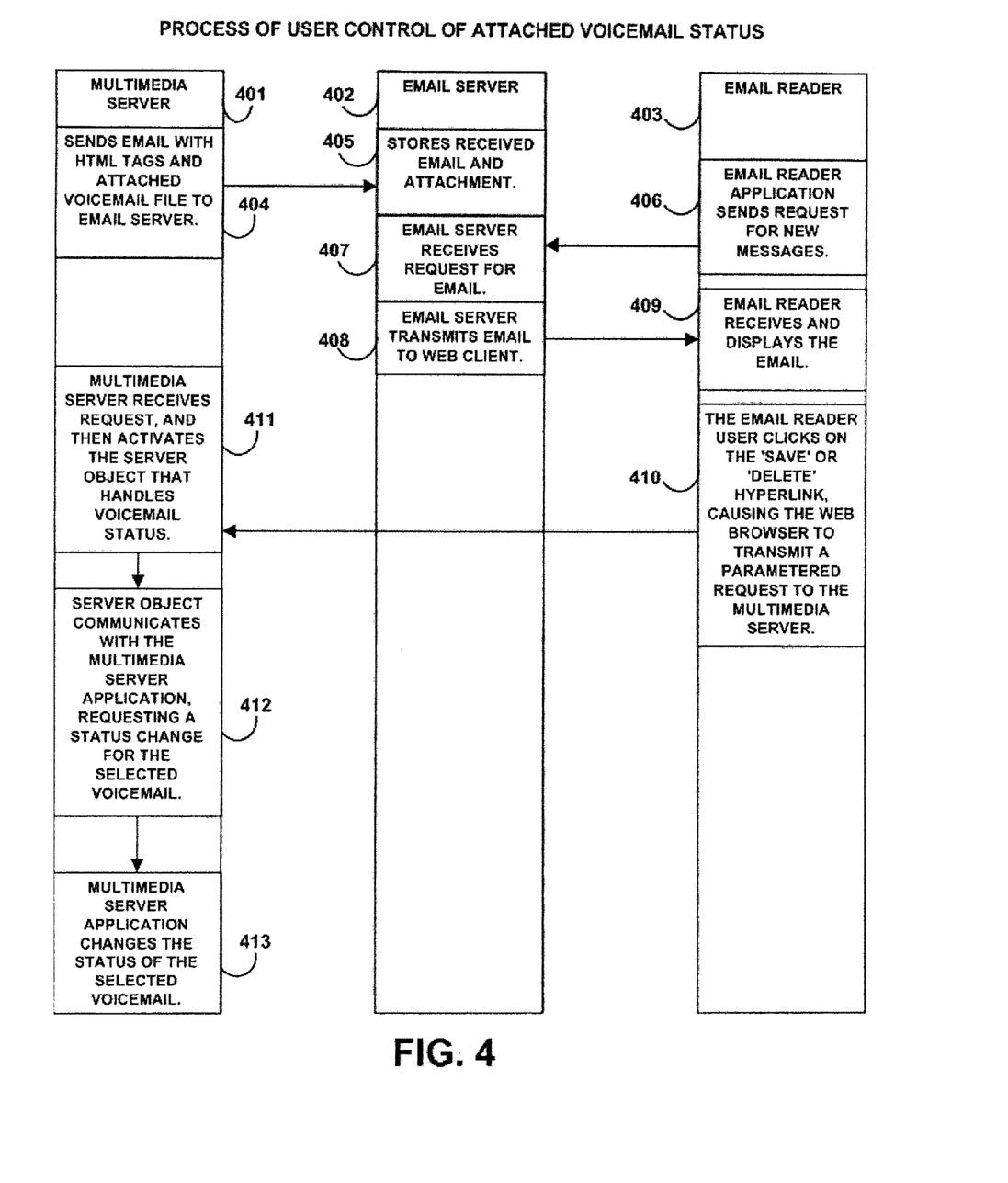
FIG. 4 is a process diagram that describes, according to an alternate embodiment of the invention, the order of actions involved with the selective changing of the status of a multimedia message stored on a multimedia server, wherein one of a plurality of hyperlinks contained in the body of an email is activated when the user clicks on the selected hyperlink.

Now referring to FIG. 4, a process of user-controlled voicemail status management is shown. This drawing represents the actions taken by various components during the process of automatically changing the status (saving or deleting, in this example) of a voicemail.

Still referring to FIG. 4, it can be seen that multimedia server 401 completes step 404, wherein an email (with separate "delete" and "save" HTML tags and attached voicemail file) is sent to email server 402. Email server 402 then completes step 405, wherein a copy of the email and its attachment are stored locally. The email and its attachment can remain stored until a request is received to retrieve them, or may alternately be automatically deleted by email server 402 after a certain period of time. This is dependent on the policies of the enterprise that operates email server 402.

In step 406, the email reader application operating on email reader 403 sends a message to email server 402, requesting any new email messages. When email server 402 receives this request in step 407, it responds in step 408 by transmitting a copy of the stored email and its attached voicemail file to email reader 403. In step 409, email reader 403 receives and displays the email.

When the email is opened (in step 410), the user can click upon either HTML tag contained in the email body. The clicked-upon HTML tag is activated, thereby generating a request that is transmitted to multimedia server 401. In step 411, multimedia server 401 activates the server object that handles voicemail status. Each of the HTML tags contains a different set of parameters or a link to a different object, and thereby requests a different action (i.e., save versus delete).

The server object interprets the request, and then communicates, in step 412, with the multimedia server application operating on multimedia server 401, requesting the selected status change for the voicemail.

Finally, in step 413, multimedia server 401 changes the status of the selected voicemail as requested.

In this embodiment of the present invention, the requested status is determined by parameters stored in the clicked-upon HTML tag of the email. Alternatively, a separate object can reside on the server for each action type, and each of the HTML tags contained in the email could point to that performs the action associated with the tag. For instance, there can be a "save" object on the server, and a "save" HTML tag in the email. When the user clicks on the "save" HTML tag, the request generated by the web browser application is addressed to the "save" object on the server. Similarly, a "delete" HTML tag would point specifically to the "delete" object residing on the server.

In this manner, when a voicemail is sent to a subscriber as an attachment to an email, when the subscriber opens the email and clicks on a selected HTML tag, the status of the attached voicemail is automatically updated at the multimedia server where it was originally stored.

From this description and its referenced figures, it can be seen that a unique and useful invention is disclosed. It is to be understood that this disclosure is not intended to limit the application of the present invention, but rather to provide explanation of the workings of the invention and some examples of its application in a practical sense. The claimed features, functions and operation of the present invention can be found in the attached claims.

I claim:

1. In a telecommunications system, wherein a multimedia message is stored and assigned a unique identity under the control of a multimedia server application, said multimedia server application being in communication with, and responsive to at least one command when received from, at least one message status control object, and wherein an email message can have attached to itself a file that contains said stored multimedia message, or a reference (link) to said stored multimedia message, and wherein said email message can also have contained in its body, or any other part of said email, at least one embedded component, a method for automating control of the status of said stored multimedia message when said email message is retrieved using an email reader, and one of said embedded component is activated manually by a user of said email reader, including the steps of:

a) said multimedia server application attaches said file containing said stored multimedia message to said email, or inserts a reference (link) to said stored multimedia message into said email, b) said multimedia server application inserts at least one said embedded component into said email, or into an object attached to said email, each said embedded component containing necessary and properly formatted information, including a targeted status for only said stored multimedia message, and not for said email itself, to cause, when said embedded component is activated under the control of said email reader, said email reader to transmit a request message to said message status control object, each said embedded component having said properly formatted information that differs from the said properly formatted information contained in any other said embedded component contained in said email, c) said multimedia server application transmits said email addressed to said user via an email server, d) said user retrieves and opens said email and manually activates one selected said embedded component contained in said email, the selected said embedded component relating to a targeted status for only said stored multimedia message, and not relating to a status of said email itself, causing said email reader to transmit a request message to said message status control object, the transmission of the request message not involving the email server, said request message containing said properly formatted information associated with said one selected embedded component, e) said message status control object evaluates said properly formatted information received with said request message, thereby determining said targeted status of only said stored multimedia message, and not of said email, and said unique identity of only said stored multimedia message, and not of said email, f) said status control object communicates with said multimedia server application, transmitting a command to modify the current status of only said stored multimedia message to said targeted status, wherein the command does not modify a status of said email, g) said multimedia server application, upon receipt of said command, changing the status of only said stored multimedia message to said targeted status, without changing a status of said email.

2. The method of claim 1, wherein said targeted status of said stored multimedia message can be at least one of:
delete, save, mark as retrieved, mark as not retrieved, turn email notification off, resend email with link to said stored multimedia message, and resend email with said stored multimedia attached.

3. The method of claim 1, wherein said stored multimedia message is a data file whose contents represent audio received in a voicemail.

4. The method of claim 1, wherein said stored multimedia message is a data file whose contents represent video received in a message.

5. The method of claim 1, wherein said multimedia message is a data file whose contents, while stored under the control of a multimedia server application, cause said multimedia server application to trigger the transmission of at least one page from a paging means.

6. The method of claim 1, wherein said multimedia server application is software or firmware operating on a server computer, and said message status control object is operating as software or firmware on said computer, said computer being in communication with a network, wherein said network allows connection and communication between at least one said email reader and said multimedia server application, and said network allows connection and communication between at least one said email reader and at least one said message status control object.

7. The method of claim 6, wherein said network is the Internet, and said email reader is software or firmware operating on a client computer, said email reader communicating with said multimedia server application and said message status control object using Internet protocols and methods.

8. In a telecommunications system, wherein a multimedia message is stored and assigned a unique identity under the control of a multimedia server application, said multimedia server application being in communication with, and responsive to at least one command when received from, at least one message status control object, and wherein an email message can have attached to itself a file that contains said stored multimedia message, or a reference (link) to said stored multimedia message, and wherein said email message can also have contained in its body, or any other part of said email, at least one embedded component, a method for automating control of the status of said stored multimedia message when said email message is retrieved using an email reader, and said email is opened by a user of said email reader, including the steps of:
a) said multimedia server application attaches said file containing said stored multimedia message to said email, or inserts a reference (link) to said stored multimedia message into said email,
b) said multimedia server application inserts at least one said embedded component into said email, or into an object attached to said email, said embedded component including an HTML tag containing necessary and properly formatted information to cause, when activated under the control of said email reader, said email reader to transmit a request message to said message status control object, the request message relating to the stored multimedia message and not to said email itself,
c) said multimedia server application transmits said email addressed to said user via an email server,
d) said user retrieves and opens said email, in response to which said email reader automatically activates said embedded component, causing said email reader to transmit a request message to said message status control object, the transmission of the request message not involving the email server, the request message relating to the stored multimedia message and not to said email itself,
e) said message status control object evaluates said received with said request message, thereby determining said unique identity of only said stored multimedia message, and not of said email,
f) said status control object communicates with said multimedia server application, transmitting a command to modify the current status of only said stored multimedia message to said predetermined status, wherein the command does not modify a status of said email,
g) said multimedia server application, upon receipt of said command, changing the status of only said multimedia message to said predetermined status, without changing a status of said email.

9. The method of claim 8, wherein said predetermined status of said stored multimedia message can be at least one of:
delete, save, mark as retrieved, mark as not retrieved, turn email notification off, resend email with link to said stored multimedia message, and resend email with said stored multimedia attached.

10. The method of claim 8, wherein said stored multimedia message is a data file whose contents represent audio received in a voicemail.

11. The method of claim 8, wherein said stored multimedia message is a data file whose contents represent video received in a message.

12. The method of claim 8, said multimedia message is a data file whose contents, while stored under the control of a multimedia server application, cause said multimedia server application to trigger the transmission of at least one page from a paging means.

13. The method of claim 8, wherein said multimedia server application is software or firmware operating on a server computer, and said message status control object is operating as software or firmware on said computer, said computer being in communication with a network, wherein said network allows connection and communication between at least one said email reader and said multimedia server application, and said network allows connection and communication between at least one said email reader and at least one said message status control object.

14. The method of claim 13, wherein said network is the Internet, and said email reader is software or firmware operating on a client computer, said email reader communicating with said multimedia server application and said message status control object using Internet protocols and methods.

15. In a telecommunications system, wherein a multimedia message is stored and assigned a unique identity under the control of a multimedia server application, said multimedia server application being in communication with, and responsive to at least one command when received from, at least one message status control object, each said message status control object having a predetermined status to which an identified said stored multimedia message will be transitioned, and wherein an email message can have attached to itself a file that contains said stored multimedia message, or a reference (link) to said stored multimedia message, and wherein said email message can also have contained in its body, or any other part of said email, at least one embedded component, a method for automating control of the status of said stored multimedia message when said email message is retrieved using an email reader, and one of said embedded components is activated manually by a user of said email reader, including the steps of:
a) said multimedia server application attaches said file containing said stored multimedia message to said email, or inserts a reference (link) to said stored multimedia message into said email,
b) said multimedia server application inserts at least one said embedded component into said email, or into an object attached to said email, each said embedded component containing properly formatted information, including at least an identity or logical address of a specific one of said message status control objects, each said embedded component containing also a user-recognizable visual or audible feature identifying its associated targeted status for only said stored multimedia message, and not for said email itself, each said embedded component, when activated under the control of said email reader, causing said email reader to transmit a request message to said specific one of said message status control objects, each said embedded component having said properly formatted information that differs from the said properly formatted information contained in any other said embedded component contained in said email, and each said embedded component containing a link to (or address of) a specific one of said message status control objects,
c) said multimedia server application transmits said email addressed to said user via an email server,
d) said user retrieves and opens said email and manually activates one selected said embedded component contained in said email, the selected said embedded component relating to a targeted status for only said stored multimedia message, and not relating to a status of said email itself, causing said email reader to transmit a request message to a specific one said message status control object whose identity or logical address is contained in said selected embedded component, the transmission of the request message not involving the email server, said request message containing said properly formatted information associated with said one selected embedded component, e) said message status control object evaluates said properly formatted information received with said request message, thereby determining said unique identity of only said stored multimedia message, and not of said email, f) said status control object communicates with said multimedia server application, transmitting a command to modify the current status of only said stored multimedia message to said predetermined status, wherein the command does not modify a status of said email, h) said multimedia server application, upon receipt of said command, changing the status of only said stored multimedia message to said predetermined status, without changing a status of said email.

16. The method of claim 15, wherein said predetermined status of said stored multimedia message can be at least one of:

delete, save, mark as retrieved, mark as not retrieved, turn email notification off, resend email with link to said stored multimedia message, and resend email with said stored multimedia attached.

17. The method of claim 15, wherein said stored multimedia message is a data file whose contents represent audio received in a voicemail.

18. The method of claim 15, wherein said stored multimedia message is a data file whose contents represent video received in a message.

19. The method of claim 15, wherein said multimedia message is a data file whose contents, while stored under the control of a multimedia server application, cause said multimedia server application to trigger the transmission of at least one page from a paging means.

20. The method of claim 15, wherein said multimedia server application is software or firmware operating on a server computer, and said message status control object is operating as software or firmware on said computer, said computer being in communication with a network, wherein said network allows connection and communication between at least one said email reader and said multimedia server application, and said network allows connection and communication between at least one said email reader and at least one said message status control object, and wherein said network is the Internet, and said email reader is software or firmware operating on a client computer, said email reader communicating with said multimedia server application and said message status control object using Internet protocols and methods.

* * * * *